United States Patent
Robinson et al.

(10) Patent No.: US 9,514,219 B2
(45) Date of Patent: Dec. 6, 2016

(54) SYSTEM AND METHOD FOR CLASSIFYING DOCUMENTS VIA PROPAGATION

(71) Applicant: FTI CONSULTING, INC., Annapolis, MD (US)

(72) Inventors: Eric Michael Robinson, Bellevue, WA (US); Manfred J Gabriel, Ashfield, MA (US)

(73) Assignee: FTI CONSULTING, INC., Annapolis, MD (US)

( * ) Notice: Subject to any disclaimer, the term of this patent is extended or adjusted under 35 U.S.C. 154(b) by 3 days.

(21) Appl. No.: 14/564,047

(22) Filed: Dec. 8, 2014

(65) Prior Publication Data

US 2015/0100590 A1    Apr. 9, 2015

Related U.S. Application Data

(63) Continuation of application No. 13/657,781, filed on Oct. 22, 2012, now Pat. No. 8,909,640, which is a continuation of application No. 13/021,618, filed on Feb. 4, 2011, now Pat. No. 8,296,290.

(60) Provisional application No. 61/302,053, filed on Feb. 5, 2010.

(51) Int. Cl.
*G06F 17/30* (2006.01)

(52) U.S. Cl.
CPC ... *G06F 17/30663* (2013.01); *G06F 17/30424* (2013.01); *G06F 17/30707* (2013.01)

(58) Field of Classification Search
CPC .................. G06F 17/30864; G06F 17/30867; G06F 17/30277; G06F 17/30247; G06F 17/30663; G06F 17/30; G06F 17/3025; G06F 17/30011; G06F 17/241
See application file for complete search history.

(56) References Cited

U.S. PATENT DOCUMENTS

| | | | |
|---|---|---|---|
| 7,526,129 B2 * | 4/2009 | Bargeron | G06K 9/00442 382/101 |
| 8,150,827 B2 | 4/2012 | Kraftsow | |
| 8,171,393 B2 | 5/2012 | Rangan et al. | |
| 2006/0291727 A1 * | 12/2006 | Bargeron | G06Q 10/10 382/218 |
| 2008/0189273 A1 | 8/2008 | Kraftsow et al. | |
| 2010/0125559 A1 * | 5/2010 | Hadjieleftheriou | G06F 17/30469 707/706 |
| 2010/0198802 A1 | 8/2010 | Kraftsow et al. | |

* cited by examiner

*Primary Examiner* — Angelica Ruiz
(74) *Attorney, Agent, or Firm* — Patrick J. S. Inouye; Krista A. Wittman

(57) ABSTRACT

A system and method for classifying documents via propagation are provided. Text highlighted by a user within at least one document is identified. The document is associated with a classification code based on the highlighted text. At least a portion of the highlighted text is compared with one or more unclassified documents. Those unclassified documents with text that is the same as the compared portion of the highlighted text in the document are identified. The classification code of the document is automatically assigned to the identified unclassified documents with text that is the same. Further, those unclassified documents with text that is similar to the compared portion of the highlighted text in the document are identified. The unclassified documents with similar text are provided to the user for review and classification.

20 Claims, 6 Drawing Sheets

SYSTEM AND METHOD FOR CLASSIFYING DOCUMENTS VIA PROPAGATION

CROSS-REFERENCE TO RELATED APPLICATION

This patent application is a continuation of U.S. patent application Ser. No. 13/657,781, filed Oct. 22, 2012, pending, which is a continuation of U.S. Pat. No. 8,296,290, issued Oct. 23, 2012, which claims priority under 35 U.S.C. §119(e) to U.S. Provisional Patent Application Ser. No. 61/302,053, filed Feb. 5, 2010, the disclosure of which is incorporated by reference.

FIELD

The invention relates in general to information retrieval and, specifically, to a system and method for classifying documents via propagation.

BACKGROUND

Document review is an activity frequently undertaken in the legal field during the discovery phase of litigation or regulatory investigations and requires reviewers to assess the relevance of documents to a particular topic or discovery request. Based on the relevance of the documents, a classification code can be assigned. The classification codes can include "responsive," "non-responsive," and "privileged" codes, as well as codes for specific substantive issues. A "responsive" document includes text that is related to or responsive to the particular topic or issue, while a "non-responsive" document fails to include such text. Meanwhile, a "privileged" document contains information that is protected by a privilege, meaning that the document may be withheld from an opposing party. Disclosing a "privileged" document can result in a waiver of privilege to the specific document or its subject matter.

As the amount of electronically-stored information (ESI) increases, the time and expense for conducting a document review also increases. Typically, document review is undertaken manually. However, with the increasingly widespread movement to ESI, manual document review is no longer practicable since reviewers are unable to review, analyze, and assign a classification code to each individual document for large amounts of information.

Conventional methods for enhancing efficiency by identifying relevant documents exist. For example, in U.S. Patent Application Publication No. 2007/0288445, to Kraftsow, a search for relevant documents is performed using a plurality of query terms. Once applied, those documents that satisfy the search query are identified as relevant and a probability of relevancy is determined. A threshold is applied to the probabilities and those documents associated with probabilities that do not satisfy the threshold are removed from the responsive documents subset. However, the responsive results fail to consider responsive documents that are the same as or similar to a particular issue.

Further, in U.S. Patent Application Publication No. 2008/0189273, to Kraftsow, a query for conducting a document relevance search is automatically generated. A reviewer highlights relevant language in one or more documents. The language highlights are analyzed to identify idioms, which are removed prior to query generation. Also, known phrases and parts of speech are identified for use in generating the query. Upon generation, the query is submitted to a Boolean search engine for conducting the search. However, only a single result set is identified, rather than different levels of search results.

Additionally, in U.S. Patent Application Publication No. 2010/0198802, to Kraftsow, search queries are automatically generated. A first set of terms is created from which any matching terms are removed. Next, a second set of terms is created from the first set of terms by removing idioms from the first set. Subsequently, a third set of terms is created from the second set by identifying parts of speech in the second set. Finally, the search query is generated from the third set of terms and a search is conducted using the query. The search identifies a single set of documents that satisfy the query, rather than multiple sets of results, which vary in similarity to a previously classified document.

Thus, there remains a need for efficiently and accurately decreasing the time and expense needed to conduct information retrieval, such as during a document review, by propagating information, including marking decisions, from one or more documents to related documents.

SUMMARY

A system and method for classifying documents via propagation are provided. Text highlighted by a user within at least one document is identified. The document is associated with a classification code based on the highlighted text. At least a portion of the highlighted text is compared with one or more unclassified documents. Those unclassified documents with text that is the same as the compared portion of the highlighted text in the document are identified. The classification code of the document is automatically assigned to the identified unclassified documents with text that is the same. Further, those unclassified documents with text that is similar to the compared portion of the highlighted text in the document are identified. The unclassified documents with similar text are provided to the user for review and classification.

Still other embodiments of the present invention will become readily apparent to those skilled in the art from the following detailed description, wherein are described embodiments by way of illustrating the best mode contemplated for carrying out the invention. As will be realized, the invention is capable of other and different embodiments and its several details are capable of modifications in various obvious respects, all without departing from the spirit and the scope of the present invention. Accordingly, the drawings and detailed description are to be regarded as illustrative in nature and not as restrictive.

DETAILED DESCRIPTION

Searching for and identifying relevant documents can be a long, time-consuming process based on the large amounts of electronically-stored information, including documents. Analyzing one or more documents and propagating the information obtained from the documents to related documents via systematic document seeding can be both time efficient and cost effective. During systematic document seeding a reviewer can mark one or more documents and seed a search for related text using the document markings.

Figure 1:
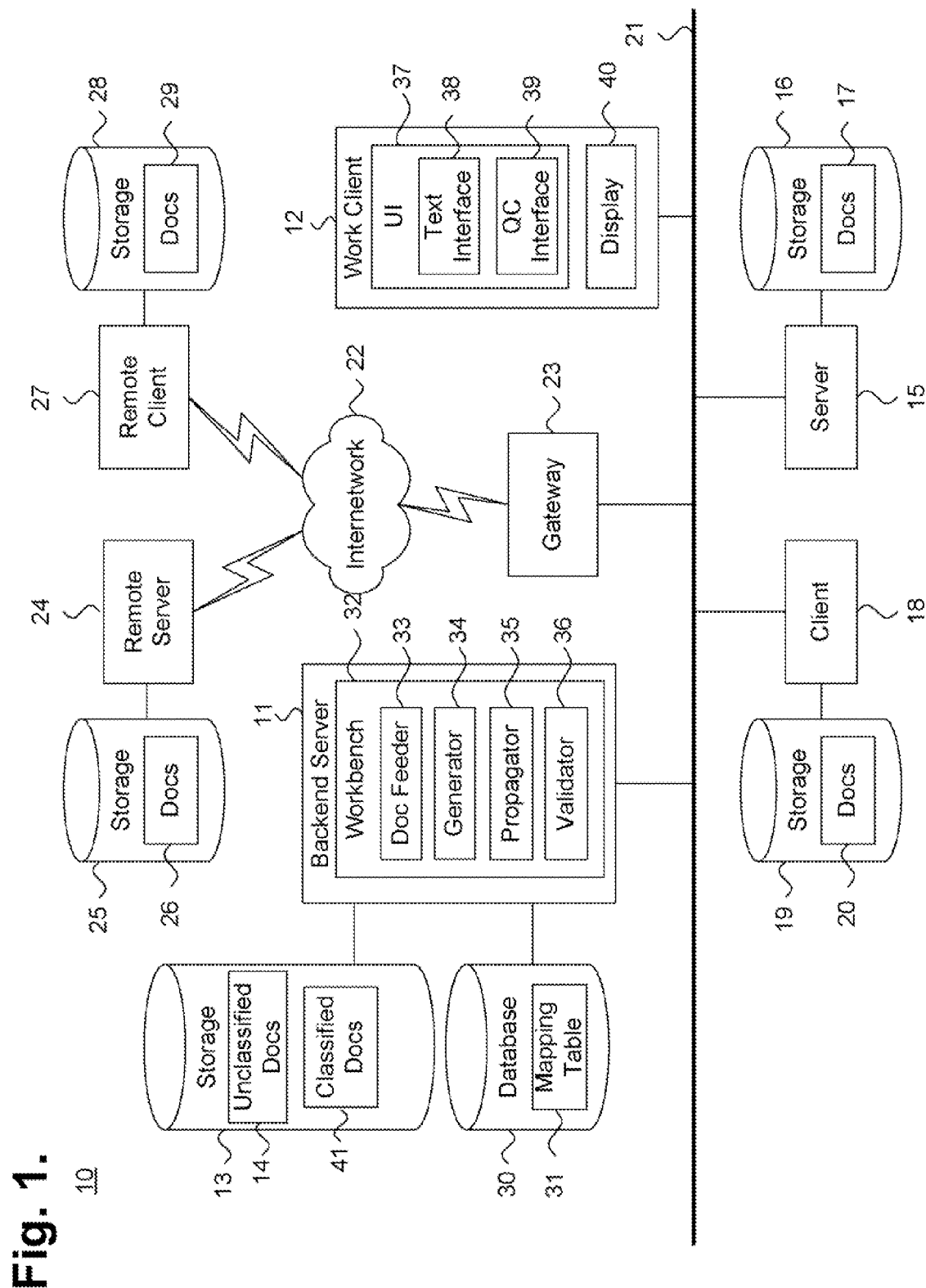
FIG. 1 is a block diagram showing a system for propagating classification decisions, in accordance with one embodiment.

Systematic document seeding requires a support environment within which decisions can be propagated across a corpus of electronically-stored information. FIG. 1 is a block diagram showing a system 10 for propagating classification decisions, in accordance with one embodiment. By way of illustration, the system 10 operates in a distributed computing environment, which includes a plurality of heterogeneous systems and sources of electronically-stored information ("ESI"). Henceforth, a single item of ESI will be referenced as a "document," although ESI can include other forms of non-document data. A backend server 11 is coupled to a storage device 13, which stores documents 14 to be reviewed by a user.

The backend server 11 is also coupled to an intranetwork 21 and executes a workbench software suite 31 for propagating responsive decisions. In a further embodiment, the backend server 11 can be accessed via an internetwork 22. The workbench software suite 32 includes a document feeder 33, a generator 34, a propagator 35, and a validator 36. Other workbench suite modules are possible.

The document feeder 33 selects unclassified documents from a document corpus for providing to one or more users. The unclassified documents have not been reviewed, analyzed, marked by a user, or classified with a classification code. Each user can include an individual assigned to review and analyze documents for one or more issues during a document review project. Hereinafter, unless otherwise indicated, the terms "reviewer" and "user" are used interchangeably with the same intended meaning Document review is generally performed during the legal discovery stage of litigation, or during an investigation. During document review, individual reviewers, generally licensed attorneys, are assigned sets of documents for classifying. The reviewer assigns classification codes to the documents based on the document's subject matter and content in comparison to predetermined legal issues for the litigation or investigatory request. The classification codes can include "privileged," "responsive," or "non-responsive," as well as specific substantive issues. Other codes are possible. A "privileged" document contains information that is protected by a privilege, meaning that the document may be withheld from an opposing party. Disclosing a "privileged" document can result in a waiver privilege for the document or its subject matter. A "responsive" document contains information that is related to a legal matter, or issue, on which the document review project is based, or falls under a specification of the discovery or investigatory request. A "non-responsive" document includes information that is not related to the legal matter or issue, and doesn't respond to a discovery or investigatory request. Hereinafter "issue" is used to refer to the legal matter or issue, or specific discovery request.

During a document review, the document feeder provides documents to the user randomly or according to selection parameters. Once presented, the user reviews the documents and indicates whether that document includes material that is responsive to a pending issue. If so, the user provides a marking indicator, such as "highlights," for the responsive portion of the text. For instance, in a product liability lawsuit, a plaintiff claims that a wood composite manufactured by the defendant induces and harbors mold growth. The issues can include "product defect," "failure to disclose," and "mold growth." The user can identify and highlight text in one or more of the documents that relates to at least one of the issues. The highlighted document can then be considered as a document that is responsive to the issues and the "responsive" classification code can be assigned.

The generator 34 generates a search query from the highlighted text and executes a search for related or similar documents within the corpus. Once identified, the propagator 35 can automatically classify the similar documents by assigning a "responsive" classification code to the similar documents. Alternatively, the similar documents can be presented to the user for further review and classification. Hereinafter, unless otherwise indicated, the terms "classified document" and "responsive document" are used interchangeably with the same intended meaning. The validator 35 performs a review of the unclassified and classified documents to ensure that all or mostly all the responsive documents have been identified and classified.

The backend server 11 is interconnected to the work client 12 via the intranetwork 21 or the internetwork 22. The work client 12 includes a user interface 37 for allowing the user to interact with the documents and search queries, and a display 40 for presenting the unclassified and classified documents. The user interface 37 includes a text interface 38 and a quality control ("QC") interface 39. The text interface 38 allows the user to mark text in an unclassified document that is determined to be responsive, such as by highlighting, and to assign a tag to the document. The mark indicates that the reviewer identifies and classifies the document as "responsive." The quality control interface 39 allows the user to review the search queries, as well as manipulate or export the search queries as part of quality control review. Quality control is further discussed in detail below with reference to FIG. 4.

The workbench 32 operates on unclassified documents 14, which can be retrieved from the storage 13, as well as a plurality of local and remote sources. The local and remote sources can also store the unclassified or "responsive" documents 41. The local sources include documents 17 maintained in a storage device 16 coupled to a local server 15 and documents 20 maintained in a storage device 19 coupled to a local client 18. The local server 15 and local client 18 are interconnected to the backend server 11 and the work client 12 over the intranetwork 21. In addition, the workbench 32 can identify and retrieve documents from remote sources over the internetwork 22, including the Internet, through a gateway 23 interfaced to the intranetwork 21. The remote sources include documents 26 maintained in a storage device 25 coupled to a remote server 24 and documents 29 maintained in a storage device 28 coupled to a remote client 27. Other document sources, either local or remote, are possible.

The individual documents 14, 17, 20, 26, 29, 41 include all forms and types of structured and unstructured ESI, including electronic message stores, word processing documents, electronic mail (email) folders, Web pages, and graphical or multimedia data. Notwithstanding, the documents could be in the form of structurally organized data, such as stored in a spreadsheet or database.

In one embodiment, the individual documents 14, 17, 20, 26, 29, 41 can include electronic message folders storing email and attachments, such as maintained by the Outlook and Outlook Express products, licensed by Microsoft Corporation, Redmond, Wash. The database can be an SQL-based relational database, such as the Oracle database management system, release 8, licensed by Oracle Corporation, Redwood Shores, Calif.

Identifying responsive text and propagating a responsive classification decision across related document can be performed by the system 10, which includes individual computer systems, such as the backend server 11, work server 12, server 15, client 18, remote server 24 and remote client 27. The individual computer systems are general purpose, programmed digital computing devices consisting of a central processing unit (CPU), random access memory (RAM), non-volatile secondary storage, such as a hard drive or CD ROM drive, network interfaces, and peripheral devices, including user interfacing means, such as a keyboard and display. The various implementations of the source code and object and byte codes can be held on a computer-readable storage medium, such as a floppy disk, hard drive, digital video disk (DVD), random access memory (RAM), read-only memory (ROM) and similar storage mediums. For example, program code, including software programs, and data are loaded into the RAM for execution and processing by the CPU and results are generated for display, output, transmittal, or storage.

Figure 2:
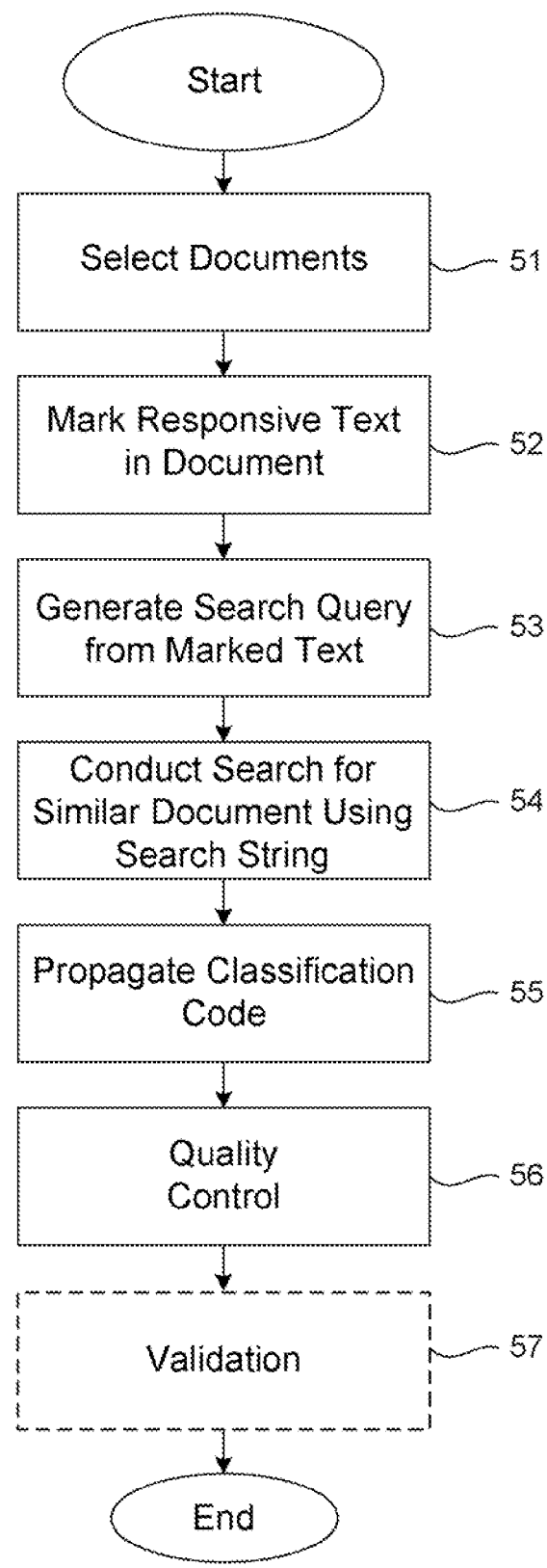
FIG. 2 is a process flow diagram showing a method for propagating classification decisions, in accordance with one embodiment.

Systematic document seeding allows a user to select text in a document that is responsive to predetermined issue and to propagate the responsive decision to related documents. FIG. 2 is a process flow diagram showing a method for propagating classification decisions, in accordance with one embodiment. One or more unclassified documents are selected for review (block 41) by a user. The documents can be selected randomly or through a similarity search based on previously classified documents. In one embodiment, the similarity search is based on attenuated search, which is described infra. Document selection is further discussed below with reference to FIG. 3. The user determines whether each of the selected documents includes responsive subject matter and if so, the user highlights the responsive text in the document (block 42). A search string is generated from the highlighted text (block 43) and applied to a corpus of documents to conduct a search for similar documents (block 44). A classification code is then propagated (block 45) across the documents that satisfy the search query to indicate that each document includes responsive text. Quality control can optionally be performed (block 46) on the marked or highlighted text, search query, or classified documents to ensure a certain level of quality for the classified documents. Performing quality control is discussed in further detail below with reference to FIG. 4. Validation can optionally be performed (block 47) on the unclassified documents to ensure that all or substantially all the responsive documents have been identified. Validation is further discussed below in detail with respect to FIG. 5.

Selecting Sample Documents

Figure 3:
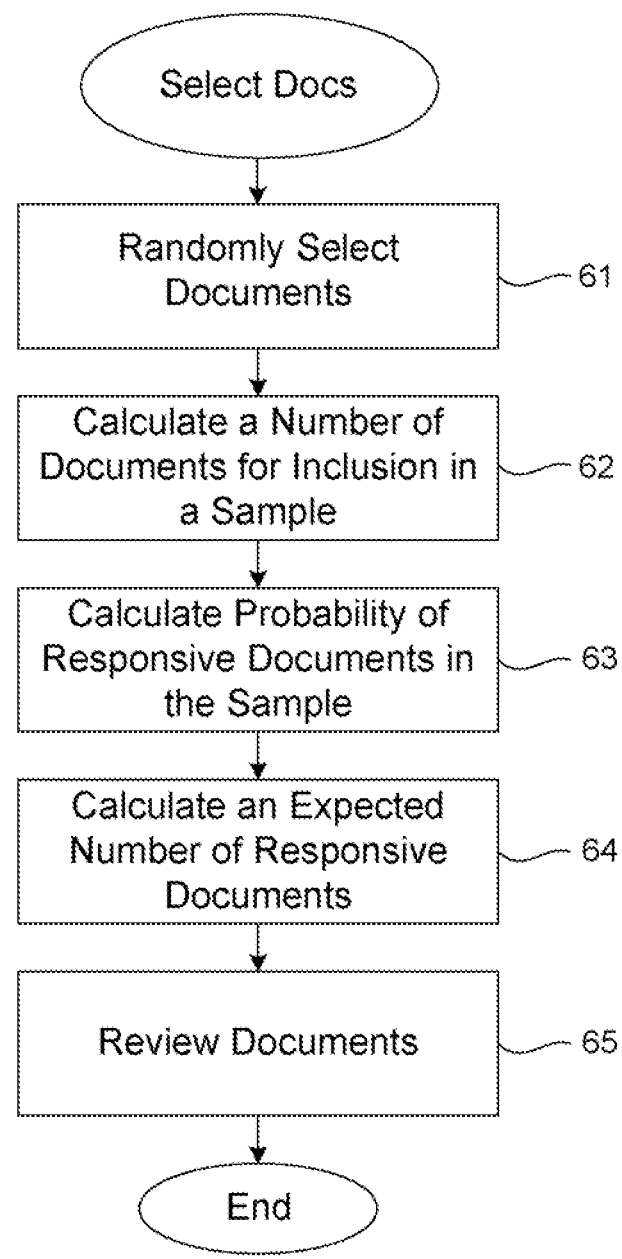
FIG. 3 is a data flow diagram showing, by way of example, a process for selecting unclassified documents for presenting to a user.

One or more documents are selected and provided to a user for review. The number of documents selected should be large enough to adequately and effectively represent a probability of responsive documents included in the document corpus, yet small enough to ensure time efficiency. FIG. 3 is a data flow diagram showing, by way of example, a process 60 for selecting unclassified documents for presenting to a user. In an initial stage of systematic document seeding, little is known about a document corpus, such as a probability distribution regarding responsive to non-responsive documents and a number of documents to be selected as a sample from the corpus for review by the user. Thus, the documents can be randomly selected (block 61) until there are enough random documents to calculate a probability of responsive documents in the corpus.

In one embodiment, the Murmur Hash algorithm can be used to randomly select documents from a non-uniform document corpus. The Murmur Hash is calculated for each document based on a unique document identifier, such as main_id. The number of documents, n, necessary for random review are then calculated based on a predetermined confidence level and acceptable error. The Murmur Hash values are sorted and the first n documents are selected for providing to the user for review. The value of n can be determined by a desired confidence level and a level of acceptable error.

Initially, the number of n documents is unknown, but can be determined (block 62) once a user commences document review, analysis, and marking of randomly selected documents. The number of documents to be randomly sampled (block 62) can be calculated according to the following equation:

$$n = \frac{z^2 pq}{E^2} \quad (1)$$

where z is the abscissa of the normal curve, E is the desired level of precision, p is the probability that a document includes responsive text, and q is the probability that a document fails to include responsive text. E can provided by the user as a global setting for a review. Further, since the reference and non-reference probabilities are unknown, a maximum variance can be assumed so that both the reference and non-reference probabilities are set to 0.5, which is the largest value of n for given values of E and z. The user can set the value for the desired confidence level, while z is determined based on a desired confidence level and standard deviations of a normal curve. Specifically, a percentage for a desired confidence level is provided and the area under a normal curve for that percentage is determine to lie within a particular number of standard deviations, which is assigned as a value for z. Common values for z are provided in the table below:

TABLE 1

| Confidence Level | Z |
| --- | --- |
| 95% | 1.96 |
| 98% | 2.33 |
| 99% | 2.58 |

In one example, E has a value of 0.05 and the desired confidence level is set to 95%. Thus, the value of n is calculated as follows:

$$n = \frac{(1.96)^2(.5)(.5)}{(.05)^2} = 385 \text{ documents} \quad (2)$$

Each of the 385 documents are presented to one or more reviewers and analyzed for text that is responsive to one or more topics. The identified responsive text is then marked, such as by highlighting the text. A number of the documents that include responsive text is determined and entered into the probability equation (block 63) for responsiveness as the value for r. In this example, 35 documents were identified as having responsive material.

In the current example, upon review of at least 385 documents, a value for p can be determined (block 63) according to the following equation:

$$p = \frac{r}{n} \quad (3)$$

where p is the probability that a document includes text that is responsive to an issue, r is a number of documents reviewed by a user and classified as responsive, and n is a total number of randomly sampled documents. Thus, a value for p is calculated as follows:

$$p = \frac{35}{385} = .09 \times 100\% = 9\% \quad (4)$$

After the probability of responsiveness, p, is calculated, further documents can be selected based on a similarity search, rather than randomly, until an expected number of total responsive documents is reached or substantially reached. A total expected value (block 64) for the number of responsive documents within the corpus can be calculated according to the following equation:

$$r_{Total} = p N_{Total} \quad (5)$$

where $N_{Total}$ is a total number of documents in the document corpus. Returning to the above example, the probability of responsiveness is 9%, which is multiplied by 500,000, which is the total number of documents in the corpus. Thus, the value of documents estimated to be responsive, $r_{Total}$, is 45,000. Review of the documents (block 65) can continue by the reviewer until the total expected number of responsive documents is reached or substantially reached. The total expected number of responsive documents can be substantially reached when a predetermined percentage of the responsive documents have been identified, such as 98%. For example, once the number of identified responsive documents reaches 356, which is 98% of 363, validation testing can begin, as described in detail below with reference to FIG. 5 to determine whether all or substantially all the responsive documents have been identified.

The document selection process, as described above, can occur concurrently with steps 51, 52, 53, and 54 of FIG. 2. For example, a search query can be generated after a particular number of documents have been reviewed. Once determined, the search results can then be provided to the user for review of responsive text until the total expected number of responsive documents is satisfied.

Identifying Responsive Text

The selected documents are provided to a user for review. During the review, the user can look for and mark responsive material, such as portions of the text that are responsive to a particular issued involved in the document review. In one embodiment, a user need only identify only a single issue, which is marked and a further document is provided. For example, upon review, the user identifies a first language string that serves as a basis for marking the text as responsive. Contiguous and non-contiguous text can be marked as responsive material. For example, if text in an email is the basis of a responsive decision in part because of who sent the email, the user should mark the senders name and the non-contiguous text. The marking is captured as metadata qualifiers, so the search query constructed from the marked text is derived from the text string plus the metadata qualifier, "from=[name]." The markings can include a text box, highlighting, "cut and paste," underlining, and different font styles or sizes. Other markings of responsive material are possible.

After a document is marked responsive, a further document is provided for review. The further document can be provided automatically or upon request by the user. Prior to presenting a further document, each current document can be marked as responsive for one or more issues. In one embodiment, review of a document can be terminated upon a finding of text responsive to a single issue to improve review speed since the user need only read as far as necessary to identify a first issue as responsive text. However, the document may include additional language responsive to the same or other issues. In a further embodiment, all text responsive to an issue can be identified and marked prior to the presentation of a further document. The different issues can be marked with a different indicator, such as color, font, or size, to distinguish between the issues. Other indicators are possible.

Generating a Search Query

Once marked, the responsive text can be used to systematically seed one or more searches throughout the document corpus, by generating and applying a search query. Other methods for identifying related documents are possible. The search query can include one or more words selected from the marked text with search parameters. The selected words can be located in a contiguous selection of text or an aggregate of non-contiguous text portions.

At one extreme, the search string can include the entire selected text in quotation marks and will only identify the exact same text in other documents. However, this approach may fail to recognize relevant documents that do not include the exact text. At the other extreme, a search string can parse out noise words and range or inclusiveness operators to vary the search.

In one embodiment, the search query can be generated using Boolean operators. The Boolean operators include "AND," "OR," or "NOT" operators, one or more of which are provided between two or more of the terms to broaden or narrow the search performed by the search query. The terms to be included in the search query and the Boolean operators can be determined automatically or by the user.

In a further embodiment, a similarity search, such as attenuated search, is used to generate the search query for conducting a search. Initially, tokens are identified for inclusion in the search query. Stop words can be removed from the data excerpt and the tokens are extracted as noun phrases, which are converted into root word stem form, although individual nouns or n-grams could be used in lieu of noun phrases. The noun phrases can be formed using, for example, the LinguistX product licensed by Inxight Software, Inc., Santa Clara, Calif. In a further embodiment, the stop words can be customized as using a user-editable list. In a still further embodiment, the search terms can be broadened or narrowed to identify one or more synonyms that are conjunctively included with the corresponding search term in a search query. The tokens are compiled into an initial search query that can be further modified by "Proximity" and "Contains" control inputs.

The "Contains" control provides only those documents that include at least h tokens, as search terms. At one extreme of the control range of the "Contains" control, the number of included search terms, h, can vary from one search term to the total number of search terms in the marked text at the other extreme of the control range. In one example, the "Contains" parameter is set to h=2 and the identified tokens are "cat," "dog," and "play," such that CONTAIN(["cat," "dog," "play"]2). The search query is then generated as "(cat AND dog) OR (cat AND play) OR (dog AND play)." Any document that includes at least one combination of two or more of the tokens is returned as a search result.

The "Proximity" control specifies a span, or window, within each unclassified document over which matching search terms must occur. The span size is defined as the distance between any two matching terms. If two terms occur next to each other, the span between the terms is zero. Thus, a minimum of two matching terms is required to form a span. For example, using the terms, "cat," "dog," and "play", as listed above, documents with a combination of two or more of the search terms within 15 terms of each other are desired. The search query can be generated as SPAN(["cat," "dog"], 15) OR SPAN(["cat," "play"], 15) OR SPAN(["dog," "play"], 15).

Other values and parameters can be used during attenuated search, which is further described in commonly-assigned U.S. patent application Ser. No. 11/341,128, pending, filed on Jan. 27, 2006, the disclosure of which is incorporated by reference.

In one embodiment, a new query is generated for each text selection that is marked "responsive" and a collection of queries for a common issue can be used to propagate a classification code across the corpus of unclassified documents. The search queries for the common issue can be applied to the corpus simultaneously or at different times. In a further embodiment, a single query can be generated based on all text selections that are marked "responsive" for a common issue. Subsequently, the single query is applied to the corpus.

Search and Propagation

Once generated, the search query is applied to the unclassified documents remaining in the document corpus to identify results that satisfy the search query. Each unclassified document selected as a result can be marked or "tagged" as including text that is responsive to the search. The similarity search capability can be used to distinguish different levels of search breadth. At one level, documents can be considered to include text that is the "same" as the highlighted text in a document previously classified as "responsive." At a different level, documents can be considered "similar" to the highlighted text based on the previously classified document. The measure of similarity between a document, as a potential search results and a previously classified document can be based on settings of the "Contains" and "Proximity" controls.

For example, a search term is generated using one or more words from the highlighted text. The "Contains" and "Proximity" controls are then set to be highly inclusive of the terms. The unclassified documents that pass the "more inclusive" bar can be determined to be the "same" as the previously classified document and automatically classified as responsive. Meanwhile, the search query can be modified by changing the settings of the "Contains" and "Proximity" controls to be less inclusive of the terms. Documents that satisfy or "pass" the "less inclusive" bar can be determined as "similar" documents and provided to the user for review and subsequent classification as responsive, if appropriate. Thus, the search query can be used as a similarity threshold via the "Contains" and "Proximity" controls to identify the "same" and "similar" documents. In one embodiment, the similarity threshold can be associated with a similarity value, such as a percentage.

Upon each selection of issue-responsive text by a user, two levels of search results can be generated. Propagation of a responsive classification code can be based on the different levels of search results. For example, the responsive classification can be automatically propagated across the "same" documents, whereas, "similar" documents can be presented to the user for further review and classification with a "responsive" decision. Alternatively, all documents can be automatically classified as "responsive" or all documents can be provided to the user for review.

The "similar" documents can be ranked by a similarity expressed as a percentage. When providing the "similar" documents to the user, the documents can be presented in ascending order of similarity or a randomly selected "similar" document. Upon review, the user can analyze and classify the presented "similar" document as including "responsive" text, if applicable.

Search information for each of the unclassified documents provides as a result can be stored to monitor search dates for ensuring that the search is still current or determining whether a search needs to be refreshed.

Quality Control

Figure 4:
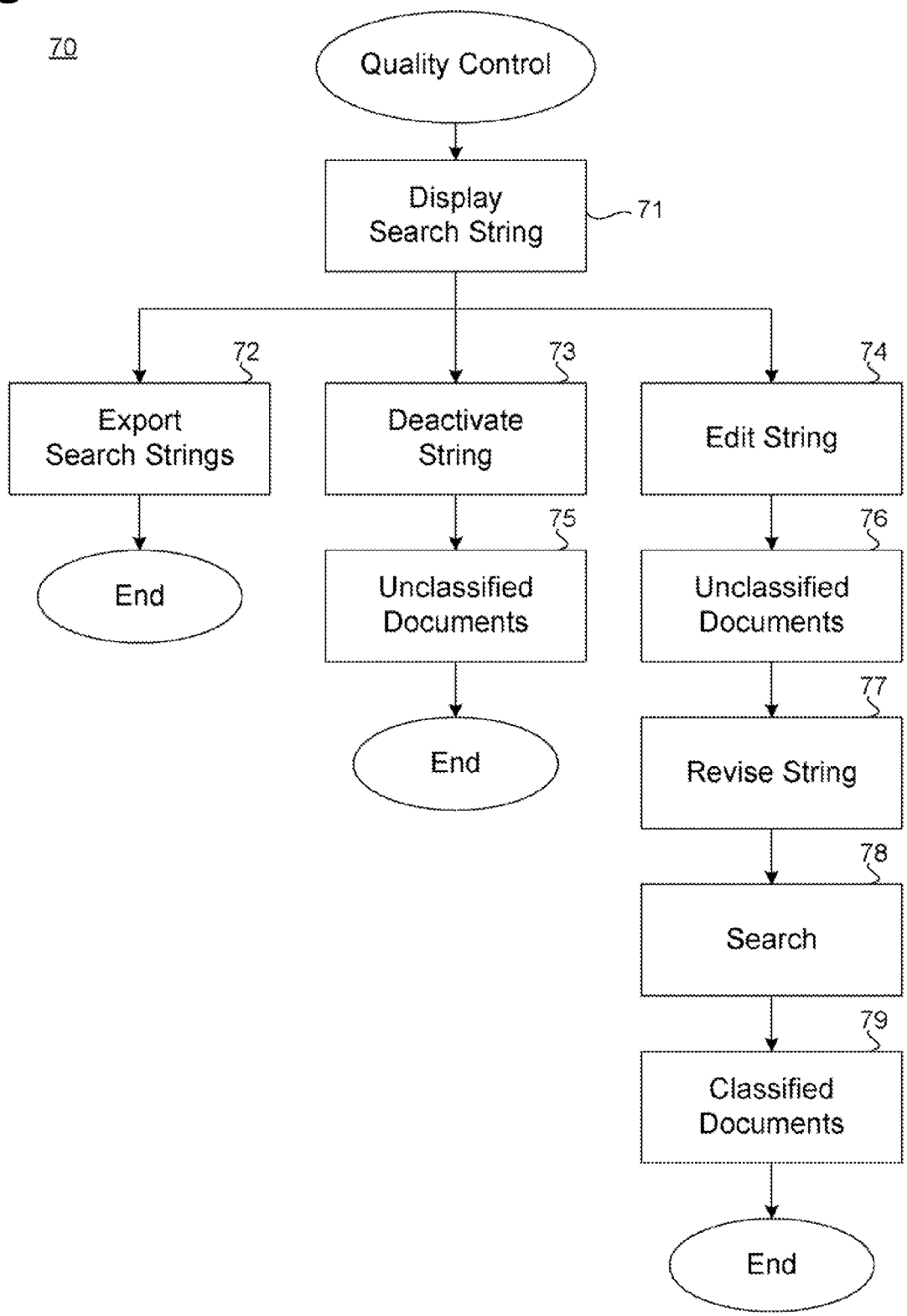
FIG. 4 is a flow diagram showing, by way of example, a process for performing quality control.

To ensure that a quality of the search results is sufficient, a user or other reviewer can review, edit, or deactivate the generated search queries. FIG. 4 is a flow diagram showing, by way of example, a process 70 for performing quality control. Quality control review can be necessary when a quality of the search results using the current search query is unsatisfactory, such as receiving search results that are over or under inclusive. The quality control review can be performed using sensitivity analysis or sampling. Sensitivity analysis is based on comparing a number of documents that are responsive to the current query to the overall number of documents in the corpus to gauge a breadth of the search. Meanwhile, sampling includes selecting and reviewing document returned by the search query, as results, to determine whether they are responsive to the corresponding predetermined issue. Selection of the documents can be performed randomly or based on one or more search factors. Other methods for performing quality control review are possible.

One or more search queries associated with an issue are provided for display (block 71) to a user. Upon review of the displayed search query, the user can export the search query (block 72), deactivate the search query (block 73), or edit the search query (block 74).

If the user chooses to export the search query (block 72), the query is transferred to a separate display window for presentation to a user. The display window can include one or more exported search queries, which together can display a history of a search. Further, the search query can be exported to a document, such as a spreadsheet for storage and preservation. Other export locations are possible. The exported search queries allow a user or other reviewer to review, modify, and deactivate the query. However, the process ends when no action, such as modification or deactivation, is taken after review by the user.

When the search query is deactivated (block 73), all classified documents related to the search query are unclassified (block 75) and removed from the responsive documents. The search query can be deactivated when search results provided by the query are not relevant or if the issue associated with the query no longer remains an issue. In a further embodiment, the classified documents remain, even though the search query has been deactivated.

To revise a search, the user or QC reviewer can edit the search query (block 74). In particular, the user can edit the original search query or alternatively, the user can provide edits, which are incorporated with the string from the original query as a new query. The original search query is then deactivated and stored for later review. All classified documents associated with the original search query are unclassified (block 76). Next, the search query is revised (block 77) and applied to the document corpus for conducting a search (block 78) and identifying unclassified documents that satisfy the search query. Once identified, the unclassified documents can be classified (block 79) automatically or manually by the user. In a further embodiment, the classified documents associated with the original search query remain classified, and further unclassified documents are identified and classified using the revised search query.

During quality control, the similarity threshold for propagating "responsive" classification codes can be raised to decrease the risk of over-inclusion in the responsive set. Further, a review of the user's marking decisions can be reviewed to ensure that the decisions are based on the narrowest possible text selection to achieve effective propagation. Also, a sample of the responsive "same" documents can be collected and analyzed to determine whether the highlighted text selection and search query are over-inclusive. Other types of review and analysis are possible during a quality control review.

Additionally, reports and lists that include search data, including the classified documents, original highlighted text, the original "same" search string, the revised active search string, the issue, the number of documents classified, and the option to deactivate the search string can be generated during the QC review. The QC reviewer or user can then provide the search string list to an opposing party in a litigation, judicial body, or other interested party for analysis and feedback.

Validation

Figure 5:
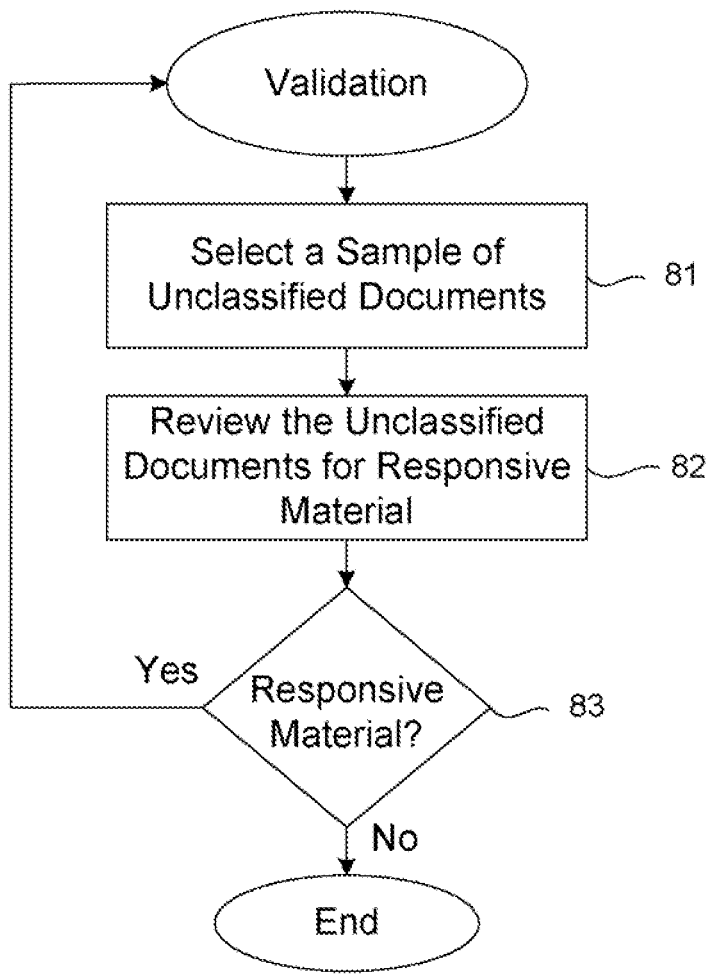
FIG. 5 is a flow diagram showing, by way of example, a process for validating the classified documents.

As the number of identified responsive documents reaches the calculated value of expected responsive documents, validation can be performed to determine whether all or almost all the responsive documents in the document corpus have been identified. FIG. 5 is a process flow diagram showing, by way of example, a process 80 for performing validation of the identified responsive documents. A sample of M unclassified documents is selected from the corpus (block 81). The M unclassified documents can be selected randomly using, for example, the Murmur Hash technique for calculating probability. Other methods for selecting the sample of M unclassified documents are possible. The sample documents are each reviewed (block 82) and analyzed to determine whether the document includes responsive material (block 83). If none of the M documents include responsive material, validation is complete and all or substantially all the responsive documents are determined to have been identified. Otherwise, if one or more of the documents is determined to include responsive material, validation can start over by selecting another sample (block 81) or further review of the documents can be performed (not shown).

In one embodiment, the value for M can be determined based on a selected confidence level and upper bound of unclassified documents left in the corpus according to the following equations:

$$b = \frac{x}{M} \quad (6)$$

$$M = \frac{x}{b} \quad (7)$$

where b is the upper bound, and x/M is an equation selected based on the confidence level. The upper bound is a value associated with the number of responsive documents that are unclassified and remain in the document corpus. For example, to state with 95% confidence that less than 1% of the remaining unclassified documents are responsive, the equation associated with a 95% confidence level is selected from the table below:

TABLE 1

| Confidence Level | Upper Bound Equation (x/M) |
|---|---|
| 86.5% | 2/M |
| 95.0% | 3/M |
| 98.2% | 4/M |
| 99.3% | 5/M |

Thus, for a selected confidence level of 95%, the upper bound equation, b=3/M is selected. Next, M is calculated by M=3/0.01=300 documents. Therefore, at least 300 unclassified documents should be reviewed during validation and if none of the documents include responsive material, 1% or less of responsive documents remain in the document corpus with a confidence level of 95%. As the confidence level increases, the number of unclassified documents to review also increases. The confidence level and upper bound value can each be selected automatically or by a user.

In a further embodiment, validation can be performed on responsive documents to determine whether all privileged document have been identified to avoid waiving privilege by disclosing a privileged document. For example, a sample of M responsive documents is obtained. The sample documents are each analyzed to determine whether the document includes responsive material. If none of the M documents include responsive material, validation is complete and all or substantially all the responsive documents are determined to have been identified. Otherwise, if one or more of the documents is determined to include responsive material, validation can start over by selecting another sample or further review of the documents can be performed.

Figure 6:
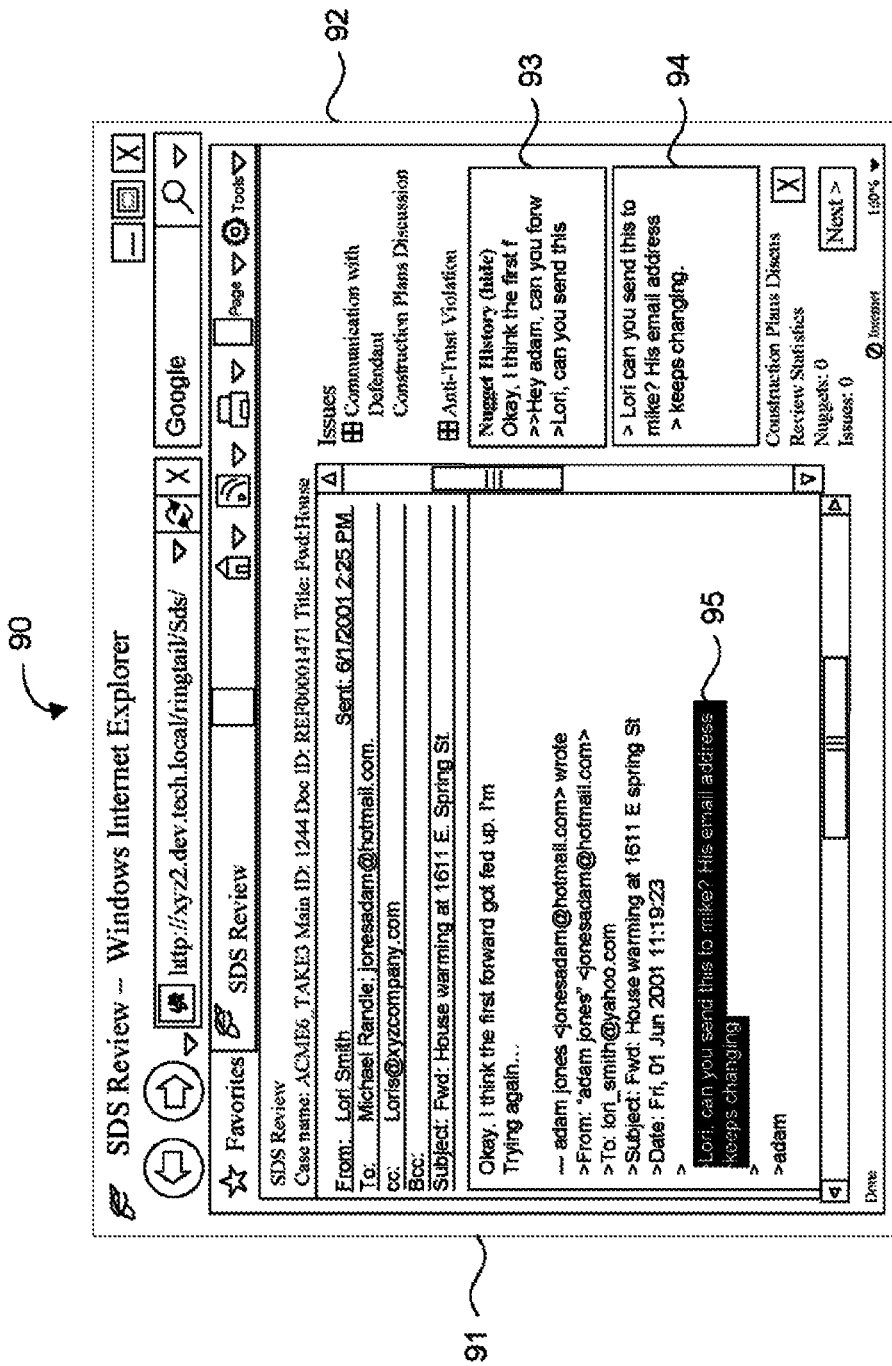
FIG. 6 is a screenshot showing, by way of example, a Web page for marking responsive text.

User actions performed during systematic document seeding, such as highlighting responsive text and performing a QC review, can be entered via a Web page. FIG. 6 is a screenshot showing, by way of example, a Web page 90 for highlighting responsive text. The Web page 90 includes a document display window 91 located on a left hand side of the Web page; however, other locations are possible. The document display window 91 presents documents selected by the document feeder to a user. The documents can be randomly selected or selected based on a similarity measure, as described supra. The Web page 90 also includes an issues window 92, which is located on a top right side of the Web page 90. The issues window 92 lists the issues identified for the document review, which is associated with the presented documents. A history box 93 can be located on the right side of the Web page 90, below the issues window 92. The history box 93 can include text that is considered responsive and was marked by the user in a previously reviewed document. In one embodiment, the history box 93 includes the relevant text identified for the document reviewed just prior to the current document displayed. The Web page 90 also includes a relevant text box 94, which is located below the history box 93. The relevant text box 94 includes the relevant text from the current document displayed, which has been highlighted by the user. The highlighted portion 95 of the text can be displayed in the document display window 91. A next button, located below the relevant text box, allows the user to move to the next unclassified document, which is then provided in the document display window 91.

Although propagating a classification decision has been described above with reference to text strings of terms, such as nouns and noun phrases, other forms of expression, such as concepts, entities, or story objects can also be identified and applied in propagating a classification decision. A concept typically includes nouns and noun phrases obtained through part-of-speech tagging that have a common semantic meaning Entities further refine nouns and noun phrases into people, places, and things, such as meetings, animals, relationships, and various other objects. A story object is a data representation at an information semantic level and includes expressions and their relationships as determined through entity extraction or manual definition. Each story object can be tied to a document, for example, through a term, which is provided in the story object as the value of one of the object's properties. For instance, the name of a "person" story object, "Bill," may be present as a term appearing in one or more documents.

Further, the description above discusses propagating a responsive classification code across a corpus of unclassified documents. However, other classification codes can be used, including non-responsive and privileged classification codes.

While the invention has been particularly shown and described as referenced to the embodiments thereof, those skilled in the art will understand that the foregoing and other changes in form and detail may be made therein without departing from the spirit and scope of the invention.

What is claimed is:

1. A system for classifying documents via propagation, comprising:
    a text identification module to identify within at least one document, text that is highlighted by a user, wherein the document is associated with a classification code based on subject matter of the highlighted text for that document in relation to a predetermined legal issue;
    a comparison module to compare at least a portion of the highlighted text with one or more unclassified documents;
    a same document identification module to identify those unclassified documents with text that is the same as the compared portion of the highlighted text in the document;
    a classification assignment module to automatically assign the classification code of the document to the identified unclassified documents with text that is the same as the compared portion of the highlighted text in the document;
    a similar identification module to identify those unclassified documents with text that is similar to the compared portion of the highlighted text in the document;
    a distribution module to provide the unclassified documents with similar text to the user for review and classification; and
    a processor to execute the modules.

2. A system according to claim 1, wherein the text identification module identifies further text within the document that is highlighted, wherein the further text is associated with an issue different from the highlighted text.

3. A system according to claim 2, further comprising:
    an issue module to distinguish between the different issues by marking the highlighted text and the further highlighted text with a different indicator comprising at least one of color, font style, or size.

4. A system according to claim 1, further comprising:
    a determination module to determine the unclassified documents with the same text comprising:
        a query module to generate a search string comprising one or more words from the highlighted text;
        a search application module to apply the search string to the unclassified documents; and
        a document selection module to select the unclassified documents with the same text when the text is highly inclusive of the words in the search string.

5. A system according to claim 4, further comprising:
    a further document selection module to select the unclassified documents with similar text when the text is less inclusive of the words in the search string than the text that is the same as the compared portion of the highlighted text in the document.

6. A system according to claim 5, further comprising:
    a review module to perform quality control review of the search string via at least one of sensitivity analysis and sampling.

7. A system according to claim 5, further comprising:
    a delivery module to provide the search string to the user for review; and
    a receipt module to receive from the user, instructions comprising one of exporting the search string, deactivating the search string, and editing the search string.

8. A system according to claim 7, further comprising:
    a deactivation module to unclassify all documents related to the search string when the search string is deactivated.

9. A system according to claim 7, further comprising:
    an edit module to receive edits to the search string;
    a revision module to revise the search string; and
    the deactivation module to deactivate the search string without the edits.

10. A system according to claim 1, wherein the classification code comprises one of privileged, responsive, and non-responsive.

11. A method for classifying documents via propagation, comprising:
    identifying within at least one document, text that is highlighted by a user, wherein the document is associated with a classification code based on subject matter of the highlighted text for that document in relation to a predetermined legal issue;
    comparing at least a portion of the highlighted text with a plurality of unclassified documents;
    identifying those unclassified documents with text that is the same as the compared portion of the highlighted text in the document;
    automatically assigning the classification code of the document to the identified unclassified documents with text that is the same as the compared portion of the highlighted text in the document;
    further identifying those unclassified documents with text that is similar to the compared portion of the highlighted text in the document; and
    providing the unclassified documents with similar text to the user for review and classification.

12. A method according to claim 11, further comprising:
identifying further text within the document that is highlighted, wherein the further text is associated with an issue different from the highlighted text.

13. A method according to claim 12, further comprising:
distinguishing between the different issues by marking the highlighted text and the further highlighted text with a different indicator comprising at least one of color, font style, or size.

14. A method according to claim 11, further comprising:
determining the unclassified documents with the same text comprising:
  generating a search string comprising one or more words from the highlighted text;
  applying the search string to the unclassified documents; and
  selecting the unclassified documents with the same text when the text is highly inclusive of the words in the search string.

15. A method according to claim 14, further comprising:
selecting the unclassified documents with similar text when the text is less inclusive of the words in the search string than the text that is the same as the compared portion of the highlighted text in the document.

16. A method according to claim 15, further comprising:
performing quality control review of the search string via at least one of sensitivity analysis and sampling.

17. A method according to claim 15, further comprising:
providing the search string to the user for review; and
receiving from the user, instructions comprising one of exporting the search string, deactivating the search string, and editing the search string.

18. A method according to claim 17, further comprising:
unclassifying all documents related to the search string when the search string is deactivated.

19. A method according to claim 17, further comprising:
receiving edits to the search string;
revising the search string; and
deactivating the search string without the edits.

20. A method according to claim 11, wherein the classification code comprises one of privileged, responsive, and non-responsive.

* * * * *